(12) United States Patent
Konno et al.

(10) Patent No.: US 9,090,753 B2
(45) Date of Patent: Jul. 28, 2015

(54) RUBBER COMPOSITION AND PNEUMATIC TIRE USING THE RUBBER COMPOSITION

(75) Inventors: Kumiko Konno, Kodaira (JP); Motoaki Kanou, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/235,918

(22) PCT Filed: Aug. 1, 2012

(86) PCT No.: PCT/JP2012/004893
§ 371 (c)(1),
(2), (4) Date: Jan. 29, 2014

(87) PCT Pub. No.: WO2013/021586
PCT Pub. Date: Feb. 14, 2013

(65) Prior Publication Data
US 2014/0158269 A1    Jun. 12, 2014

(30) Foreign Application Priority Data
Aug. 11, 2011  (JP) .................. 2011-176280

(51) Int. Cl.
*C08K 3/34* (2006.01)
*C09C 1/42* (2006.01)
(Continued)

(52) U.S. Cl.
CPC .................. *C08K 3/04* (2013.01); *B60C 1/0008* (2013.04); *C08K 3/0033* (2013.01); *C08K 3/346* (2013.01); *C08K 5/00* (2013.01); *C08K 5/098* (2013.01); *C08L 23/22* (2013.01)

(58) Field of Classification Search
CPC ....... C08L 23/22; C08L 21/00; C08K 3/0033; C08K 3/346; C08K 5/098; C08K 5/00; C08K 3/04; B60C 1/0008
USPC ............................ 524/576, 447, 449; 152/510
See application file for complete search history.

(56) References Cited

U.S. PATENT DOCUMENTS

| 7,960,454 B2 * | 6/2011 | Waddell et al. .................. 524/53 |
| 2010/0036023 A1 * | 2/2010 | Weng et al. ....................... 524/13 |

FOREIGN PATENT DOCUMENTS

| EP | 2671917 A1 | 12/2013 |
| JP | 01-193342 A | 8/1989 |

(Continued)

OTHER PUBLICATIONS

Communication dated Oct. 27, 2014, issued by the State Intellectual Property Office of the People's Republic of China in counterpart Application No. 201280039059.0.

(Continued)

*Primary Examiner* — William Cheung
(74) *Attorney, Agent, or Firm* — Sughrue Mion, PLLC

(57) ABSTRACT

The present invention provides a rubber composition exhibiting good workability and suitable for use in an inner liner of a tire. Specifically, the present invention provides a rubber composition, comprising: a rubber component; an inorganic filler having an aspect ratio of 2 to 200; and optionally at least one of carbon black and a metal salt of aliphatic acid, wherein contents of the inorganic filler, the carbon black and the metal salt of aliphatic acid satisfy following formula (1):

$$C \geq 0.016 \times (A - 0.5 \times B) - 1.18 \qquad (1)$$

In formula (1), "A" represents a content (parts by mass) of the inorganic filler with respect to 100 parts by mass of the rubber component, "B" represents a content (parts by mass) of the carbon black with respect to 100 parts by mass of the rubber component, and "C" represents a content (parts by mass) of the metal salt of aliphatic acid with respect to 100 parts by mass of the rubber component.

6 Claims, 3 Drawing Sheets

(51) Int. Cl.
*C08G 63/48* (2006.01)
*B60C 5/02* (2006.01)
*C08K 3/04* (2006.01)
*C08L 23/22* (2006.01)
*B60C 1/00* (2006.01)
*C08K 3/00* (2006.01)
*C08K 5/098* (2006.01)
*C08K 5/00* (2006.01)

(56) References Cited

FOREIGN PATENT DOCUMENTS

| | | |
|---|---|---|
| JP | 07-40706 A | 2/1995 |
| JP | 2002088209 A | 3/2002 |
| JP | 2003-238744 A | 8/2003 |
| JP | 2003-335902 A | 11/2003 |
| JP | 2005-206673 A | 8/2005 |
| JP | 2007-112847 A | 5/2007 |
| JP | 2007-191510 A | 8/2007 |
| JP | 2009-013259 A | 1/2009 |
| JP | 2009-030808 A | 2/2009 |
| JP | 2009-138135 A | 6/2009 |
| JP | 2009-242538 A | 10/2009 |
| WO | 01/62846 A1 | 8/2001 |
| WO | 2010/074286 A1 | 7/2010 |

OTHER PUBLICATIONS

Extended European Search Report dated Feb. 10, 2015, issued by the European Patent Office in corresponding European Application No. 12822330.2.

E Steels, "Struktol Company of America", Jan. 27, 2012, XP055166276, Retrieved from the Internet: URL:http://www.struktol.com/pdfs/WB16.pdf [retrieved on Jan. 30, 2015].

State Intellectual Property Office of P. R. China, Office Action dated Jun. 3, 2015 issued in a corresponding Chinese Application No. 201280039059.0.

* cited by examiner

RUBBER COMPOSITION AND PNEUMATIC TIRE USING THE RUBBER COMPOSITION

CROSS REFERENCE TO RELATED APPLICATIONS

This application is a National Stage of International Application No. PCT/JP2012/004893, filed Aug. 1, 2012, claiming priority from Japanese Patent Application No. 2011-176280, filed Aug. 11, 2011, the contents of all of which are incorporated herein by reference in their entirety.

TECHNICAL FIELD

The present invention relates to a rubber composition and a pneumatic tire using the rubber composition for an inner liner thereof. In particular, the present invention relates to a rubber composition exhibiting good workability, for an inner liner.

BACKGROUND ART

It has conventionally been proposed to decrease air permeability of an inner liner of a tire to reduce thickness of the inner liner, so that tire weight and fuel consumption of the tire are reduced accordingly. For example, use of a rubber composition containing lower-grade carbon black at a high blending content for an inner liner has been proposed to reduce thickness of the inner liner. However, the resulting inner liner has problems in terms of flex (bending) resistance and durability at low temperature in this case.

As another conventionally known example, it is possible to reduce air permeability of an inner liner, while maintaining good flex and durability at low temperature of the inner liner, by using a rubber composition containing non-reinforcible flat mica and/or clay blended therein for the inner liner. Specifically, PTL 1 discloses a rubber composition for an inner liner of a pneumatic tire, produced by blending 100 parts by weight of solid state rubber with 1-150 parts by weight of organically treated layer state clay mineral. Further, PTL 2 discloses a rubber composition for an inner liner of a pneumatic tire, comprising a rubber component and a lamellar or flaky mineral having an aspect ratio of 3 to 30 (inclusive of 3 and exclusive of 30).

CITATION LIST

Patent Literature

PTL 1: JP 2003-335902 (Laid-Open)
PTL 2: WO 01/62846

SUMMARY OF THE INVENTION

Technical Problems

However, when a rubber composition containing non-reinforcible flat mica and/or clay blended therein at a relatively high blending content is used for the inner liner, there arises a problem in terms of workability of the rubber composition because strength of the rubber composition in the unvulcanized state (what is called "green strength") deteriorates and variations in strength occur depending on directions, thereby causing the rubber composition to adhere to a roll at the lower portion of a banbury mixer.

In view of the situation described above, an object of the present invention is to solve the aforementioned problems of the prior art and provide a rubber composition exhibiting good workability and suitable for use in an inner liner of a tire. Another object of the present invention is to provide a tire using the rubber composition for an inner liner thereof to achieve good productivity.

Solution to the Problems

As a result of a keen study to attain the objections described above, the inventors of the present invention discovered that a rubber composition having a rubber component, an inorganic filler having an aspect ratio of 2 to 200, and optionally carbon black and/or a metal salt of aliphatic acid, wherein the inorganic filler, the carbon black and the metal salt of aliphatic acid are blended such that they satisfy a specific relation formula, exhibits excellent workability, thereby completing the present invention.

Specifically, a rubber composition of the present invention characteristically comprises: a rubber component; an inorganic filler having an aspect ratio of 2 to 200; and optionally at least one of carbon black and a metal salt of aliphatic acid, wherein contents of the inorganic filler, the carbon black and the metal salt of aliphatic acid satisfy following formula (1):

$$C \geq 0.016 \times (A - 0.5 \times B) - 1.18 \quad (1)$$

In formula (1), "A" represents a content (parts by mass) of the inorganic filler with respect to 100 parts by mass of the rubber component, "B" represents a content (parts by mass) of the carbon black with respect to 100 parts by mass of the rubber component, and "C" represents a content (parts by mass) of the metal salt of aliphatic acid with respect to 100 parts by mass of the rubber component.

In a suitable example of the rubber composition of the present invention, the rubber component is butyl-based rubber. The resulting rubber composition exhibits significantly reduced air permeability and therefore is suitable for an inner liner of a tire.

The content (A) of the inorganic filler is preferably in the range of 80 to 150 parts by mass (the unit may be referred to as "pts. mass" hereinafter) with respect to 100 pts. mass of the rubber component, the content (B) of the carbon black is preferably equal to or less than 15 pts. mass with respect to 100 pts. mass of the rubber component, and the content (C) of the metal salt of aliphatic acid is preferably in the range of 0.1 to 3 pts. mass and more preferably in the range of 0.1 to 2 pts. mass with respect to 100 pts. mass of the rubber component.

A pneumatic tire of the present invention characteristically employs the aforementioned rubber composition for an inner liner thereof.

Advantageous Effect of the Invention

According to the present invention, it is possible to provide a rubber composition having a rubber component, an inorganic filler having an aspect ratio of 2 to 200, and optionally at least one of carbon black and a metal salt of aliphatic acid, wherein contents of the inorganic filler, the carbon black and the metal salt of aliphatic acid satisfy the aforementioned formula (1), which rubber composition exhibits good workability. Further, according to the present invention, it is possible to provide a tire using the rubber composition for an inner liner thereof and thus achieving good productivity.

DESCRIPTION OF THE EMBODIMENTS

Figure 1:
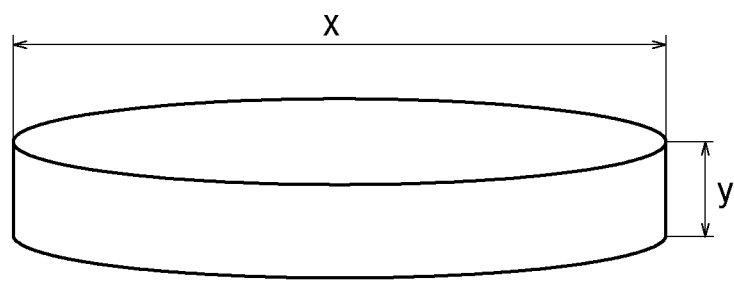
FIG. 1 is a schematic view of a flat inorganic filler.

The present invention will be described in detail hereinafter. A rubber composition of the present invention characteristically includes: a rubber component; an inorganic filler having an aspect ratio of 2 to 200; and optionally at least one of carbon black and a metal salt of aliphatic acid, wherein contents of the inorganic filler, the carbon black and the metal salt of aliphatic acid satisfy the aforementioned formula (1). More specifically, the rubber component and the inorganic filler having an aspect ratio of 2 to 200 are essential components but the carbon black and the metal salt of aliphatic acid are not in the rubber composition of the present invention; and contents of the inorganic filler, the carbon black and the metal salt of aliphatic acid are to satisfy the aforementioned formula (1) when the rubber composition includes the carbon black and/or the metal salt of aliphatic acid.

Strength of the rubber composition in the unvulcanized state (what is called "green strength") deteriorates and variations in strength occur depending on directions, thereby causing a problem in terms of workability in a manufacturing site, in a case where the rubber composition including flat inorganic filler with high aspect ratio at high blending content is used for an inner liner of a tire, as described above. The inventors of the present invention, as a result of studying a numerous number of blending prescriptions of the rubber composition in order to solve the problem, discovered that green strength of the rubber composition enhances and adhesion of the rubber composition to a roll at the lower portion of a banbury mixer can be suppressed, so that workability of the rubber composition improves to a satisfactory level, when contents of the inorganic filler, the carbon black and the metal salt of aliphatic acid in the rubber composition are set to satisfy the aforementioned formula (1). The problem of poor workability at a manufacturing site, caused by inclusion of flat inorganic filler with an aspect ratio of 2 to 200 at a high blending content in the rubber composition, is primarily attributed to adhesion of the rubber composition to a roll at the lower portion of a banbury mixer and this adhesion of the rubber composition occurs because green strength of the rubber composition is too low relative to adhesion force thereof to the roll. Therefore, decreasing adhesion force of the rubber composition to a roll is the most effective in terms of solving the problem of poor workability at a manufacturing site. It should be noted in this connection that the relationship represented by the aforementioned formula (1) is not bound by any theories but has been empirically determined as a result of the inventors of the present invention studying a numerous number of blending prescriptions of the rubber composition.

Examples of the rubber component for use in the rubber composition of the present invention include natural rubber (NR) and diene-based synthetic rubber, although type of the rubber component is not particularly limited thereto. Examples of the diene-based synthetic rubber include polyisoprene rubber (IR), polybutadiene rubber (BR), styrenrebutadiene copolymer rubber (SBR), acrylonitrile-butadiene rubber (NBR), chloroprene rubber (CR), butyl-based rubber, and the like. The respective rubber components described above may be used either solely or in combination of two or more types.

The rubber component is preferably butyl-based rubber in the rubber composition of the present invention. Air permeability of the rubber composition significantly decreases, thereby making the rubber composition suitable for use in an inner liner of a tire, in a case where the rubber component is butyl-based rubber. Examples of butyl-based rubber include halogenated butyl rubber, as well as butyl rubber (IIR). Examples of halogenated butyl rubber include chlorinated butyl rubber, brominated butyl rubber, and the like.

The rubber composition of the present invention, including the flat inorganic filler having an aspect ratio of 2 to 200 blended therein, exhibits high air impermeability because the flat inorganic filler inhibits permeation of air. The flat inorganic filler generally has a configuration of a platelet, a sheet or a flake, which is actually a plate constituted of laminated layers of filler particles having relatively high anisotropy. An aspect ratio of the flat inorganic filler is calculated as the average value of "F" represented by following formula (2):

$$F = x/y$$

In formula (2), "F" represents an aspect ratio of a flat inorganic filler, "x" represents length (the larger dimension) of the flat inorganic filler, and "y" represents thickness of the flat inorganic filler. The aspect ratio of the flat inorganic filler is preferably at least 3 and more preferably at least 5. Further, the aspect ratio of the flat inorganic filler preferably does not exceed 150, more preferably does not exceed 100, furthermore preferably does not exceed 50, and most preferably does not exceed 30. The inorganic filler having an aspect ratio of 2 to 200 for use in the rubber composition of the present invention may be either a natural product or a synthetic product. Examples of minerals as the inorganic filler include kaolin clay, mica, feldspar, hydrous composite of silica and alumina, montmorillonite, saponite, hectorite, beidellite, stevensite, nontronite, vermiculite, halloysite, and the like. Kaolin clay and mica are preferable and kaolin clay is particularly preferable among these examples. These inorganic fillers may be used either solely or in combination of two or more types. Commercially available inorganic fillers can be suitably used. Inorganic filler having an aspect ratio less than 2 cannot satisfactorily decrease air permeability in use. Inorganic filler having an aspect ratio exceeding 200 deteriorates workability of the rubber composition, thereby making the production process thereof troublesome.

The content (A) of the inorganic filler in the rubber composition, which content is selected to satisfy the aforementioned formula (1), is preferably in the range of 80 to 150 pts. mass with respect to 100 pts. mass of the rubber component. The content (A) of the inorganic filler ≥80 pts. mass with respect to 100 pts. mass of the rubber component in the rubber composition ensures satisfactory decrease in air permeability of an inner liner when the rubber composition is used for the inner liner. The content (A) of the inorganic filler ≤150 pts. mass with respect to 100 pts. mass of the rubber component in the rubber composition ensures that good flex resistance and durability at low temperature of an inner liner are maintained when the rubber composition is used for the inner liner.

The rubber composition of the present invention may contain carbon black, although inclusion of carbon black therein is not essentially required. Preferable examples of carbon black for use in the rubber composition include GPF, FEF, HAF grades of carbon black in terms of good flex resistance and durability at low temperature of an inner liner, although types of carbon black are not limited thereto in particular. The respective types of carbon black may be used either solely or in combination of two or more types.

The content (B) of carbon black in the rubber composition, which content is selected to satisfy the aforementioned formula (1), is preferably equal to or less than 15 pts. mass with respect to 100 pts. mass of the rubber component. The content (B) of the carbon black >15 pts. mass with respect to 100 pts. mass of the rubber component in the rubber composition in a case where the content (A) of the inorganic filler is ≥80 pts. mass with respect to 100 pts. mass of the rubber component may result in unsatisfactory improvement of flex resistance and durability at low temperature.

The rubber composition of the present invention preferably contains metal salt of aliphatic acid, although inclusion of metal salt of aliphatic acid therein is not essentially required. Metal salt of aliphatic acid, as a salt of aliphatic acid and a metal, suppresses adhesion of the rubber composition in the unvulcanized state to a roll of a banbury mixer, thereby causing an effect of improving workability of the rubber composition. Examples of aliphatic acid constituting the metal salt of aliphatic acid include palmitic acid, stearic acid, oleic acid, linoleic acid, and the like. Examples of metal constituting the metal salt of aliphatic acid include K, Na, Ca, Zn, Mg, Ba and the like. The metal salt of aliphatic acid can be obtained by saponification of vegetable oil such as palm oil, palm kernel oil, olive oil, almond oil, canola oil, peanut oil, rice bran oil, cocoa butter, soybean oil, cottonseed oil, sesame oil, linseed oil, castor oil, rapeseed oil, or animal oil such as beef tallow, with a base such as sodium hydroxide, potassium hydroxide or the like added thereto (i.e. hydrolysis of vegetable or animal oil with a base, to obtain glycerin and aliphatic acid metal salt). The respective types of metal salt of aliphatic acid may be used either solely or in combination of two or more types.

The content (C) of the metal salt of aliphatic acid in the rubber composition, which content is selected to satisfy the aforementioned formula (1), is preferably in the range of 0.1 to 3 pts. mass and more preferably in the range of 0.1 to 2 pts. mass with respect to 100 pts. mass of the rubber component. The content (C) of the metal salt of aliphatic acid in the range of 0.1 to 3 pts. mass with respect to 100 pts. mass of the rubber component in the rubber composition ensures conspicuous expression of an effect of improving workability of the rubber composition.

Compounding agents conventionally used in the rubber industry, e.g. antioxidant, softener, stearic acid, zinc white, vulcanization accelerator, vulcanizing agent and the like, may be appropriately selected and blended with the rubber component, the inorganic filler having an aspect ratio of 2 to 200, carbon black and the metal salt of aliphatic acid in the rubber composition of the present invention unless such addition of the compounding agents causes any adverse effect on the object of the present invention. Commercially available compounding agents can be suitably used for the purpose. The rubber composition of the present invention can be manufactured, for example, by: blending inorganic filler having an aspect ratio of 2 to 200 with the aforementioned rubber component; then optionally blending carbon black and/or metal salt of aliphatic acid with the mixture; further optionally blending various compounding agents appropriately selected according to necessity with the mixture; and subjecting the mixture to kneading and mixing, warming, extrusion and the like.

A pneumatic tire of the present invention characteristically employs the aforementioned rubber composition for an inner liner thereof. The pneumatic tire of the present invention using the rubber composition of the present invention for the inner liner thereof achieves excellent internal pressure retainability and high productivity in a manufacturing process thereof because the rubber composition exhibits satisfactory low air permeability and good workability during the manufacturing process. The pneumatic tire of the present invention is not bound by any restriction other than using the aforementioned rubber composition for an inner liner thereof and may be manufactured according to the conventional method. Examples of gas to be charged in the pneumatic tire of the present invention include ambient air, air of which oxygen partial pressure has been adjusted, and inert gas such as nitrogen, argon, helium and the like.

EXAMPLES

The present invention will be described further in detail by Examples. The present invention, however, is not bound by any of these Examples.

<Preparation and Subsequent Evaluation of Rubber Composition>

Figure 2:
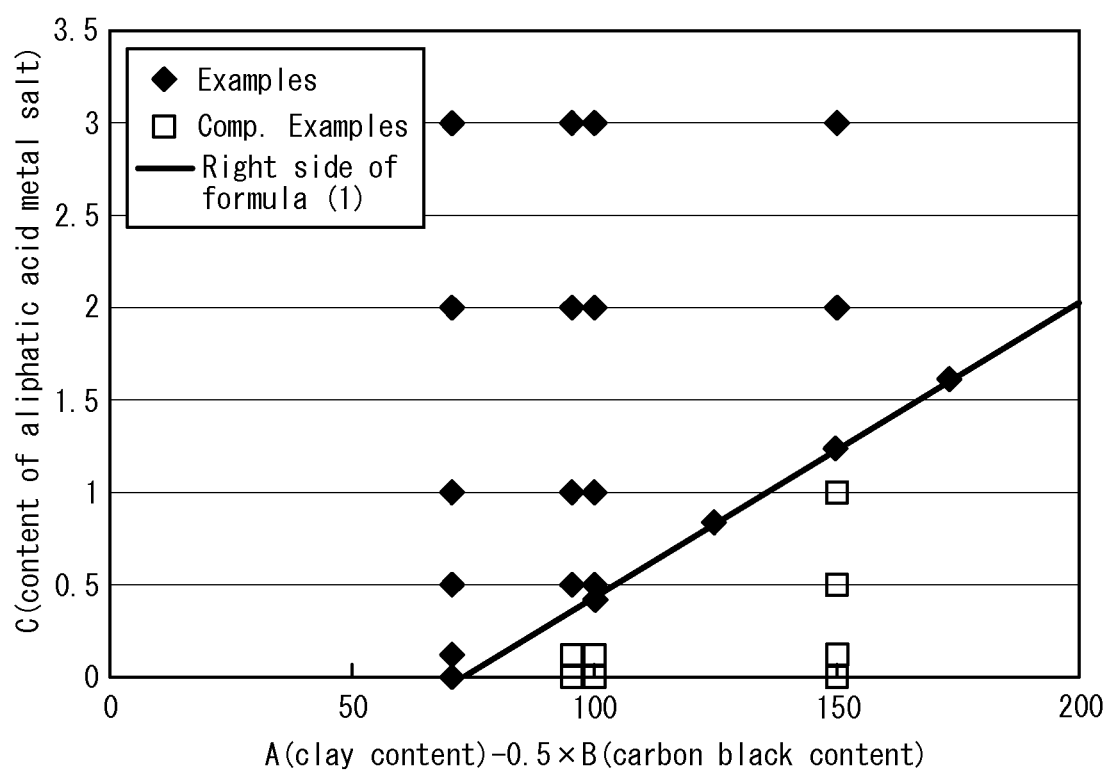
FIG. 2 is a graph produced by plotting [A (clay content)–0.5×B (carbon black content)] on the X axis and [C (content of aliphatic acid metal salt) on the Y axis, respectively, for the rubber compositions of Examples and Comparative Examples.
Figure 3:
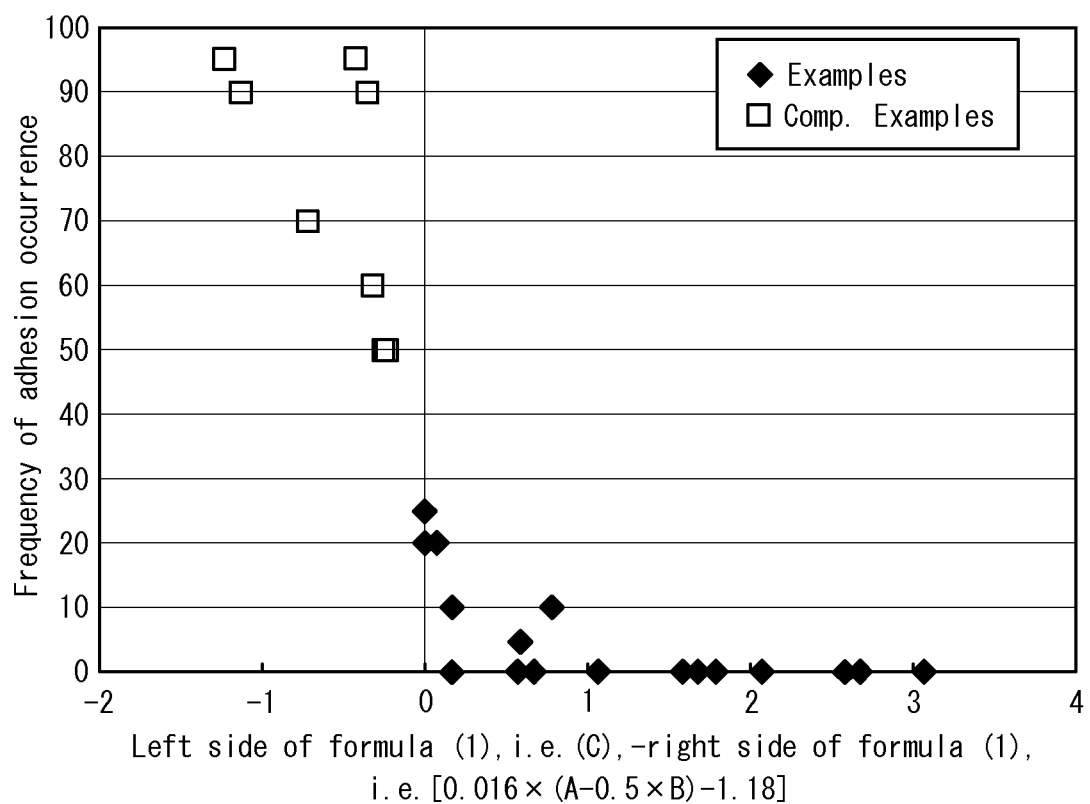
FIG. 3 is a graph produced by plotting [C (content of aliphatic acid metal salt)−0.016×{A (clay content)−0.5×B (carbon black content)}+1.18] on the X axis and frequency of adhesion occurrence on the Y axis, respectively, for the rubber compositions of Examples and Comparative Examples.

Each of test rubber compositions was prepared by: blending the components shown in Table 1 with other compounding agents including 10 pts. mass of processing oil "SUPER OIL Y22" manufactured by JX Nippon Oil & Energy Corporation, 2 pts. mass of zinc white, 1 pts. mass of sulfur; and mixing and kneading the mixture by a banbury mixer. Frequency of adhesion occurrence (unit: %), expressed as a percentage of adhesion (adhesion of the test rubber composition to a roll of the banbury mixer at the lower portion thereof) occurrence times with respect to the total (50 or more) butches or times, was measured during the blending process. The results are shown in Table 1, as well as FIG. 2 and FIG. 3. FIG. 2 is a graph produced by plotting [A (clay content)−0.5×B (carbon black content)] on the X axis and [C (content of aliphatic acid metal salt) on the Y axis, respectively, for the test rubber compositions. FIG. 3 is a graph produced by plotting [left side of formula (1)−(minus) right side of formula (1)], i.e. [C (content of aliphatic acid metal salt)−0.016×{A (clay content)−0.5×B (carbon black content)}+1.18], on the X axis and frequency of adhesion occurrence on the Y axis, respectively, for the test rubber compositions. The aforementioned formula (1) is derived from FIG. 2 and FIG. 3.

Further, air permeability and flex resistance of each of the test rubber compositions were evaluated by following methods. The results are shown in Table 1.

Air Permeability

A rubber test piece was prepared and air permeability (a gas transmission rate) thereof was measured according to JIS K 7126-1:2006 "Plastics—Film and Sheeting—Determination of gas transmission rate (Differential-pressure method)". The smaller value represents the lower air permeability.

Flex Resistance

A rubber test piece was prepared and the number of strokes experienced by the test piece prior to fracture thereof was counted under the conditions of the room temperature and 40 mm stroke according to JIS K 6260:1999 "Determination of flex cracking and crack growth (De Mattia type) of vulcanized or thermoplastic rubber". The larger number of counted strokes represents the higher flex resistance.

TABLE 1

| | Blending details | | | | | | Evaluation | | |
|---|---|---|---|---|---|---|---|---|---|
| | Brominated butyl rubber *1 | Aliphatic acid metal salt *2 C | Carbon black *3 B | Clay *4 A | Right side of formula (1) 0.016 × (A − 0.5 × B) − 1.18 | Left side of formula (1)-right side of formula (1) C − 0.016 × (A − 0.5 × B) + 1.18 | Frequency of adhesion occurrence % | Air permeability Gas transmission rate *5 | Flex resistance Times (×10⁴) |
| | | Parts by mass | | | | | | | |
| Ex. 1 | 100 | 0.5 | 0 | 100 | 0.42 | 0.08 | 20 | 1.6 | 2500 |
| Ex. 2 | 100 | 1 | 0 | 100 | 0.42 | 0.58 | 5 | 1.6 | 2500 |
| Ex. 3 | 100 | 2 | 0 | 100 | 0.42 | 1.58 | 0 | 1.6 | 2500 |
| Ex. 4 | 100 | 3 | 0 | 100 | 0.42 | 2.58 | 0 | 1.6 | 2500 |
| Ex. 5 | 100 | 0.5 | 10 | 100 | 0.34 | 0.16 | 10 | 1.7 | 380 |
| Ex. 6 | 100 | 1 | 10 | 100 | 0.34 | 0.66 | 0 | 1.7 | 380 |
| Ex. 7 | 100 | 2 | 10 | 100 | 0.34 | 1.66 | 0 | 1.7 | 380 |
| Ex. 8 | 100 | 3 | 10 | 100 | 0.34 | 2.66 | 0 | 1.7 | 380 |
| Ex. 9 | 100 | 2 | 0 | 150 | 1.22 | 0.78 | 10 | 1.3 | 800 |
| Ex. 10 | 100 | 3 | 0 | 150 | 1.22 | 1.78 | 0 | 1.3 | 800 |
| Ex. 11 | 100 | 0 | 20 | 80 | −0.06 | 0.06 | 20 | 2.2 | 200 |
| Ex. 12 | 100 | 0.1 | 20 | 80 | −0.06 | 0.16 | 0 | 2.2 | 200 |
| Ex. 13 | 100 | 0.5 | 20 | 80 | −0.06 | 0.56 | 0 | 2.2 | 200 |
| Ex. 14 | 100 | 1 | 20 | 80 | −0.06 | 1.06 | 0 | 2.2 | 200 |
| Ex. 15 | 100 | 2 | 20 | 80 | −0.06 | 2.06 | 0 | 2.2 | 200 |
| Ex. 16 | 100 | 3 | 20 | 80 | −0.06 | 3.06 | 0 | 2.2 | 200 |
| Ex. 17 | 100 | 0.42 | 0 | 100 | 0.42 | 0 | 25 | 1.6 | 2500 |
| Ex. 18 | 100 | 1.22 | 0 | 150 | 1.22 | 0 | 20 | 1.3 | 800 |
| Ex. 19 | 100 | 1.62 | 0 | 175 | 1.62 | 0 | 25 | 1 | 200 |
| Ex. 20 | 100 | 0.82 | 0 | 125 | 0.82 | 0 | 25 | 1.45 | 1500 |
| Comp. Ex. 1 | 100 | 0 | 0 | 100 | 0.42 | −0.42 | 95 | 1.6 | 2500 |
| Comp. Ex. 2 | 100 | 0.1 | 0 | 100 | 0.42 | −0.32 | 60 | 1.6 | 2500 |
| Comp. Ex. 3 | 100 | 0 | 10 | 100 | 0.34 | −0.34 | 90 | 1.7 | 380 |
| Comp. Ex. 4 | 100 | 0.1 | 10 | 100 | 0.34 | −0.24 | 50 | 1.7 | 380 |
| Comp. Ex. 5 | 100 | 0 | 0 | 150 | 1.22 | −1.22 | 95 | 1.3 | 800 |
| Comp. Ex. 6 | 100 | 0.1 | 0 | 150 | 1.22 | −1.12 | 90 | 1.3 | 800 |
| Comp. Ex. 7 | 100 | 0.5 | 0 | 150 | 1.22 | −0.72 | 70 | 1.3 | 800 |
| Comp. Ex. 8 | 100 | 1 | 0 | 150 | 1.22 | −0.22 | 50 | 1.3 | 800 |

*1 Brominated butyl rubber: "Bromobutyl 2255" manufactured by JSR Corporation
*2 Aliphatic acid metal salt: "VP1405" manufactured by Struktol Company
*3 Carbon black: "GPF" manufactured by ASAHI CARBON Co., Ltd.
*4 Clay (flat inorganic filler): "POLYFIL DL" (aspect ratio = 15) manufactured by KaMin LLC
*5 Gas transmission rate: $10^{-10}$ cm³ · cm/cm² · sec · cmHg It is understood from FIG. 2 and FIG. 3 that frequency of adhesion occurrence decreases and thus workability of the rubber composition improves when contents of clay (inorganic filler), carbon black, and metal salt of aliphatic acid satisfy the relationship of the aforementioned formula (1) or are set in the range of Examples in FIG. 2 and FIG. 3.

Further, it is understood from comparison of Examples 1 to 10 with Examples 11 to 16 that content (B) of carbon black in the rubber composition is preferably ≤15 pts. mass with respect to 100 pts. mass of the rubber component.

REFERENCE SIGNS LIST x Length (larger dimension) of flat inorganic filler
y Thickness of flat inorganic filler

The invention claimed is:

1. A rubber composition for use in an inner liner, comprising:
   a rubber component;
   a flat inorganic filler having an aspect ratio of 2 to 200; and
   at least one of carbon black and a metal salt of aliphatic acid,
   wherein a content (A) of the flat inorganic filler is in the range of 80 to 150 parts by mass and a content (B) of the carbon black is equal to or less than 15 parts by mass with respect to 100 parts by mass of the rubber component, respectively, and the contents of the flat inorganic filler, the carbon black and the metal salt of aliphatic acid satisfy following formula (1):

$$C \geq 0.016 \times (A - 0.5 \times B) - 1.18 \quad (1)$$

In formula (1), "A" represents the content (parts by mass) of the flat inorganic filler with respect to 100 parts by mass of the rubber component, "B" represents the content (parts by mass) of the carbon black with respect to 100 parts by mass of the rubber component, and "C" represents the content (parts by mass) of the metal salt of aliphatic acid with respect to 100 parts by mass of the rubber component.

2. The rubber composition for use in an inner liner of claim 1, wherein the rubber component is butyl-based rubber.

3. The rubber composition for use in an inner liner of claim 1, wherein the content (C) of the metal salt of aliphatic acid is in the range of 0.1 to 3 parts by mass with respect to 100 parts by mass of the rubber component.

4. The rubber composition for use in an inner liner of claim 1, wherein the flat inorganic filler is kaolin clay and/or mica.

5. A pneumatic tire, comprising an inner liner which comprises the rubber composition for use in an inner liner of claim 1.

6. The rubber composition for use in an inner liner of claim 1, wherein the rubber composition is free of any carbon particles.

* * * * *